US012741396B2

(12) United States Patent
Johnson et al.

(10) Patent No.: US 12,741,396 B2
(45) Date of Patent: Sep. 22, 2026

(54) NON-ROTATING BIT FOR CUTTING TOOL

(71) Applicant: Caterpillar Paving Products Inc., Brooklyn Park, MN (US)

(72) Inventors: Nicholas B. Johnson, Dayton, MN (US); Robert Edwin Carr, Sebastian, FL (US); David Castillo, Orange, CA (US); Jeff Rhode, Anaheim Hills, CA (US); David Bruno Parzynski, Jr., Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 18/927,226

(22) Filed: Oct. 25, 2024

(65) Prior Publication Data

US 2026/0115967 A1 Apr. 30, 2026

(51) Int. Cl.
*E21C 35/197* (2006.01)
*B28D 1/18* (2006.01)

(52) U.S. Cl.
CPC ............ *B28D 1/188* (2013.01); *E21C 35/197* (2013.01)

(58) Field of Classification Search
CPC ..... B28D 1/188; E21C 35/197; E21C 35/191; E21C 35/1933
See application file for complete search history.

(56) References Cited

U.S. PATENT DOCUMENTS 4,337,980 A * 7/1982 Krekeler ................ B28D 1/188 175/413
4,489,986 A * 12/1984 Dziak ..................... E21C 35/18 299/104
4,850,649 A * 7/1989 Beach ................... E21C 35/197 299/107
6,186,597 B1 2/2001 Hahn et al.
7,618,098 B2 11/2009 Frear
8,646,848 B2 2/2014 Hall
9,890,636 B2 2/2018 Hall
10,246,999 B2 4/2019 Persano
12,006,825 B2 6/2024 Kenno
2010/0295360 A1* 11/2010 Kramer ................. E21C 35/197 299/110
2015/0176409 A1* 6/2015 Latham ................... E21C 25/10 299/104
2016/0273356 A1* 9/2016 Ojanen ................. E21C 35/197
2020/0157938 A1* 5/2020 Congdon .............. E02F 9/2866
2023/0304400 A1* 9/2023 Long, II .............. E21C 35/1831
2024/0286202 A1* 8/2024 Sollami .................... B28D 7/00

FOREIGN PATENT DOCUMENTS

DE 69614634 T2 7/2002
DE 102010017587 A1 12/2011
DE 102014112964 A1 3/2016

* cited by examiner

*Primary Examiner* — Carib A Oquendo

(57) ABSTRACT

A cutting bit assembly for attachment to a tool holder of a milling-type machine includes a cutting tip, a cylindrical shank extending from the cutting tip and comprising a rotation-limiting surface, and a spring clip surrounding a body of the shank. The spring clip includes a protrusion configured to interact with the rotation-limiting surface of the shank to limit rotation of the shank relative to the spring clip. The spring clip includes a contracted configuration and an expanded configuration, and in both the contracted configuration and the expanded configuration the protrusion interacts with the rotation-limiting surface.

20 Claims, 7 Drawing Sheets

NON-ROTATING BIT FOR CUTTING TOOL

TECHNICAL FIELD

The present disclosure relates generally to bits for cutting tools, and more particularly to a non-rotating bit assembly for a tool holder of a milling-type machine such as a cold planer or rotary mixer.

BACKGROUND

Asphalt-surfaced roadways facilitate vehicular travel. Depending upon usage density, base conditions, temperature variation, moisture variation, and/or physical age, the surface of the roadways can eventually become misshapen, non-planar, unable to support wheel loads, or otherwise unsuitable for vehicular traffic. To rehabilitate the roadways for continued vehicular use, worn road surface (e.g., asphalt or concrete) is removed in preparation for resurfacing.

Cold planers, sometimes also called road mills or scarifiers, are machines that typically include a frame supported by tracked or wheeled drive units. The frame is configured to provide a mount for an engine, an operator's station, and a milling drum. The milling drum, fitted with cutting tools, is turned through a suitable interface by the engine to break up the surface of the roadway. In a typical configuration, multiple cutting tools are provided on an external surface of the milling drum. The cutting bits are conventionally mounted to the tool holders such that the cutting bits are free to rotate during use.

However, rotation of the cutting bit has several notable disadvantages. For certain cutting bits, such as those having polycrystalline diamond (PCD) tips, rotation of the cutting bit allows all side of the bit to wear, which reduces the strength of the bit. Further, rotation of cutting tools can lead to wear and consequently reduced service of the tool holder. For example, rotation of the cutting bit may result in wear on the face and the internal bore of the tool holder (that is contacted by the cutting bit) such that the tool holder is less effective at or incapable of holding cutting bits.

U.S. Pat. No. 8,646,848 to Hall et al. (hereinafter "the '848 patent") discloses a pick assembly including a pick shank configured to be press fit directly within a bore of a block. The pick shank includes an inside and outside surface, and the pick includes a pick head opposite the shank. The shank comprises at least one longitudinal recess extending towards the pick head along the shank from a distal end of the shank. The recess allows the shank to resiliently collapse upon insertion into the bore while maintaining a press fit between the bore and the shank. The shank additionally has tapered regions that engage in a press fit with a corresponding tapered region of the bore of the block.

The '848 patent requires a block having a non-standard, tapered bore. As such, the pick shank cannot be used as a universal replacement without first retrofitting the cutting machine with the required tapered block.

The cutting bit assembly of the present disclosure solves one or more of the problems set forth above and/or other problems in the art.

SUMMARY OF THE INVENTION

According to an aspect of the present disclosure, a cutting bit assembly for attachment to a tool holder of a milling-type machine includes a cutting tip, a generally cylindrical shank extending from the cutting tip and including a rotation-limiting surface, and a spring clip surrounding a body of the shank. The spring includes an indentation configured to interact with the rotation-limiting surface of the shank to limit rotation of the shank relative to the spring clip. The spring clip includes a contracted configuration and an expanded configuration, and in both the contracted configuration and the expanded configuration the indentation interacts with the rotation-limiting surface.

In an aspect, a cutting bit system for attachment to a tool holder of a milling-type machine includes a cutting tip, a cylindrical shank extending from the cutting tip and including a rotation-limiting surface defining a channel extending along a portion of the cylindrical shank, and a spring clip that surrounds at least a portion of the cylindrical shank when the cylindrical shank and spring clip are inserted into a tool holder and including an indentation configured to interact with the rotation-limiting surface of the shank to limit rotation of the shank relative to the spring clip.

In an aspect, a method for installing a cutting bit into a tool holder of a milling-type machine includes inserting a shank of the cutting bit into a mounting bore of the tool holder with a spring clip in a contracted configuration, and releasing the spring clip from the contracted configuration so that the spring clip exerts a radially outward force against the mounting bore of the tool holder, thereby causing the spring clip to be rotationally locked to the mounting bore, wherein the spring clip includes an indentation configured to interact with a channel including a rotation-limiting surface of the shank to limit rotation of the shank relative to the spring clip and to the tool holder.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Wherever possible, the same reference numbers will be used throughout the drawings to refer to the same or like parts. In the figures, the left-most digit(s) of a reference number identifies the figure in which the reference number first appears.

Figure 1:
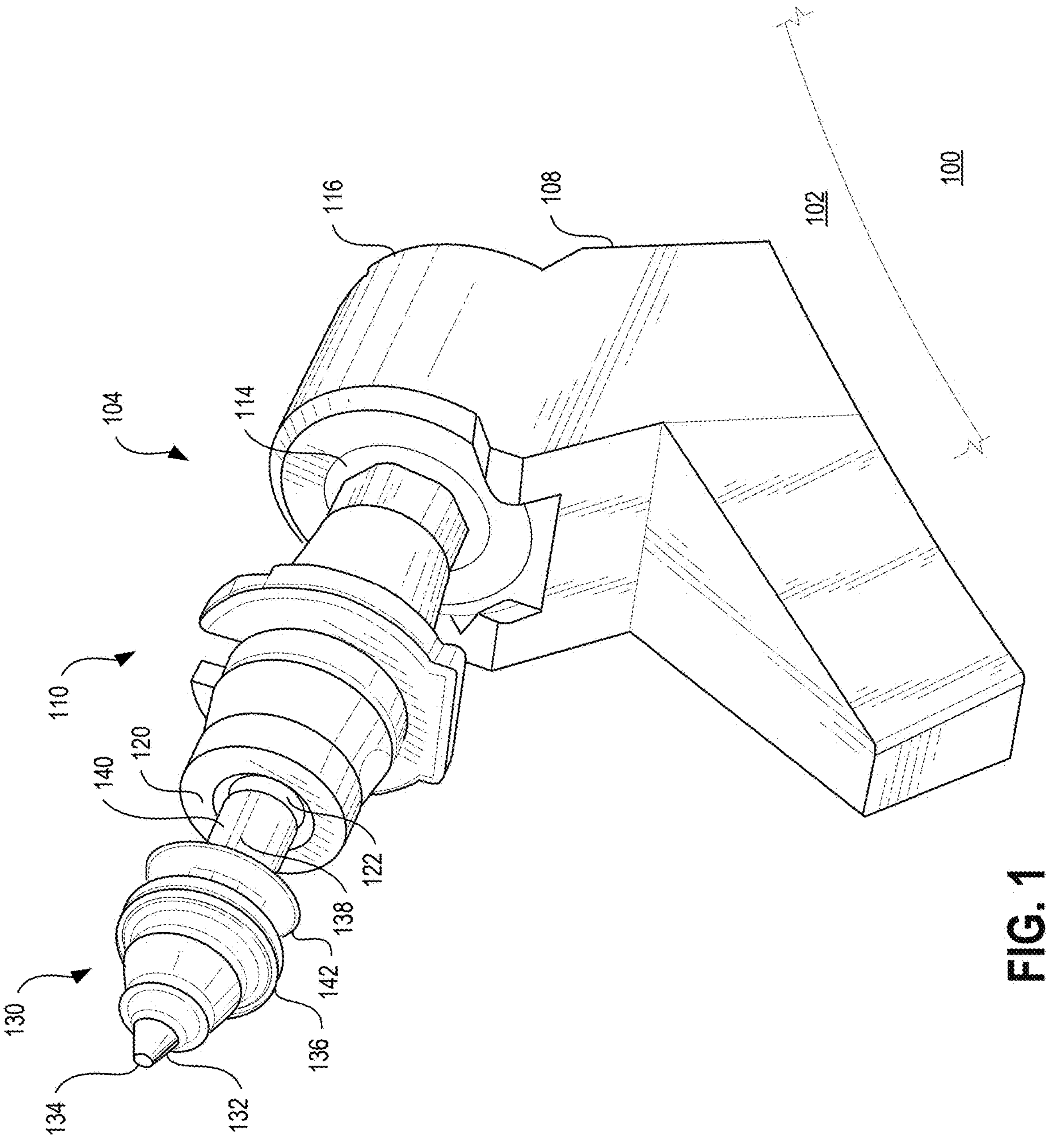
FIG. 1 illustrates an exploded view of a cutting tool of a cold planer, according to at least one example.

Referring to FIG. 1, a cold planer or other milling-type of machine (e.g., rotary mixer) includes a milling drum 100 which is a generally cylindrical, rotating structure for cutting and grinding a substrate such as a roadway asphalt. Milling drum 100 has an outer surface 102 on which a plurality of tool assemblies 104 are arranged. Each tool assembly 104 includes a tool mounting block 108, a tool holder 110, and a cutting bit assembly 130. Tool assemblies 104 may be arranged in such a way that rotation of milling drum 100 causes the cutting bit assembly 130 of each tool assembly 104 to fragment and remove material from the roadway surface and channel it to a collection device (not shown). While only a single tool assembly 104 is shown in FIG. 1, milling drum 100 may have several tool assemblies 104 arranged in a series of rows, rings, spirals, etc. on outer surface 102.

For each tool assembly 104, tool mounting block 108 may be fixed to the milling drum outer surface 102, for example, by welding, and is configured to removably receive tool holder 110 in a mounting bore 114 of a mounting portion 116. Tool holder 110 includes an end face 120 and a mounting bore 122 configured to removably receive cutting bit assembly 130. Mounting bore 122 may have an inner diameter of, for example, 20 millimeters (mm).

The cutting bit assembly 130 includes a cutting tip 132 and a shank 138 extending from cutting tip 132. Cutting tip 132 may be substantially conical and may have a substantially pointed distal end 134 which tapers radially outwardly to form a flange 136 from which shank 138 extends. Flange 136 may have a diameter of about 22-28 mm, and in some aspects about 45 mm. In some aspects, distal end 134 includes a polycrystalline diamond tip for milling the substrate, though other abrasive materials may alternatively be used.

The shank 138 is at least partially surrounded by a spring clip 140 which can be resiliently deflected between a contracted (or stressed) configuration and an expanded (or unstressed) configuration. Spring clip 140 may be made from a material such as spring steel that imparts elasticity to spring clip 140.

The elasticity of spring clip 140 is such that spring clip 140 is in the expanded configuration in the absence of an external constraint. In the expanded configuration, an outer diameter of spring clip 140 is larger than an inner diameter of mounting bore 122 of tool holder 110. In the contracted configuration, the outer diameter of spring clip 140 is less than that of the expanded configuration to allow spring clip 140 to be inserted into mounting bore 122 of tool holder 110. The outer diameter of spring clip 140 in the contracted configuration is slightly greater than the inner diameter of mounting bore 122, creating a slight press fit between mounting bore 122 and spring clip 140 in the contracted configuration. For example, the outer diameter of spring clip 140, in the contracted configuration, may be slightly greater than 20 mm. In some aspects, the outer surface of spring clip 140 may have a surface treatment to increase friction with mounting bore 122.

The cutting bit assembly 130 further includes a washer 142 that surrounds spring clip 140 and holds spring clip 140 in the contracted configuration on the shank 138. Washer 142 is generally flat and annular in shape, having an outer diameter and a bore concentric with the outer diameter. Washer 142 may have an outer diameter approximately equal to the outer diameter of flange 136. Washer 142 may have a thickness of about 3-8 mm, and in some aspects about 5 mm. Bore of washer 142 has a diameter corresponding to the outer diameter of spring clip 140 in the contracted configuration. A proximal edge and a distal edge of the bore of washer 142 may be beveled to assist in installation, removal, and/or reuse of bit assembly 130, as described herein. Similarly, the proximal edge and the distal edge of the outer diameter of washer 142 may be beveled to assist in installation, removal, and/or reuse of bit assembly 130, as described below.

The bias of spring clip 140 acts against the bore of washer 142, which results in a friction fit that maintains an axial position of washer 142 on spring clip 140. When cutting bit assembly 130 is installed into mounting bore 122 of tool holder 110, washer 142 is pushed onto a shoulder of the shank 138 and into abutment with flange 136. The bevel on distal edge of the bore of the washer 142 may guide washer 142 onto the shoulder of the shank 138.

Figure 2:
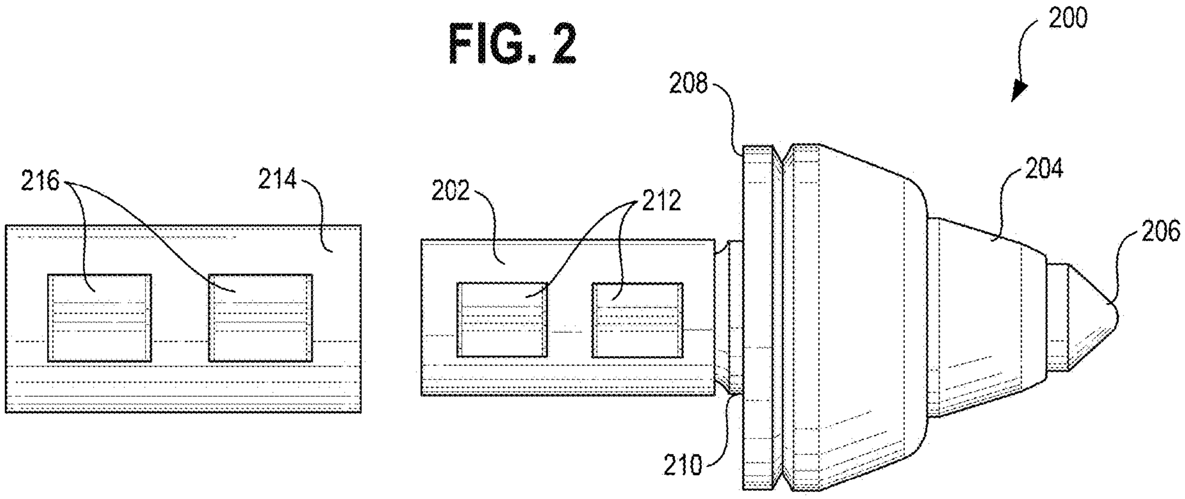
FIG. 2 illustrates a side view of cutting bit and spring clip, according to at least one example.

FIG. 2 illustrates a side view of cutting bit 200 and a spring clip 214, according to at least one example. The cutting bit 200 includes a shank 202 with a body and a shoulder 210 disposed between the shank 202 and the flange 208. The cutting bit 200 also includes a cutting tip 204 and a pointed distal end 206.

The shank 202 includes a body and a shoulder 210 between the body and the flange 208. The body of the shank 202 is generally cylindrical apart from the presence of the indentation 212 including a rotation-limiting surface, described herein. The shoulder 210 is generally cylindrical and extends 360° around body of the cutting bit 200. The shoulder 210 may have an outer diameter of slightly less than the diameter of mounting bore 122 of tool holder 110 so that shoulder 210 has a clearance fit with mounting bore 122. For example, shoulder 210 may have an outer diameter of slightly less than 20 mm. Shoulder 210 may extend longitudinally from flange 208 about 3-12 mm, and in some aspects about 5 mm.

A proximal end may be generally cylindrical with the exception of a notch or ramp that aids in assembly, as described below. The proximal end of the shank 202 may have an outer diameter of slightly less than the diameter of mounting bore 122 of tool holder 110 so that the shank 202 has a clearance fit with mounting bore 122. For example, the shank 202 may have an outer diameter of slightly less than 20 mm. The shank 202 may have a length of about 5-15 mm, and in some aspects about 10 mm.

The body of the shank 202 has an outer diameter less than that of shoulder 210, such as a diameter of about 10-36 mm, and in some aspects about 14 mm. The body of the shank 202 may have a length, e.g., the distance between shoulder 210 and the proximal end, of about 25-50 mm, and in some aspects about 35 mm. The shank 202 may be made from a strong, rigid material such as a heat-treatable steel (e.g., AISI 1040 steel).

The shank 202 includes indentations 212 defined within the body of the shank 202. The indentations 212 form channels or grooves to receive indentations from the spring clip 214 to retain the spring clip 214 relative to the cutting bit 200. The cutting bit 200 and the spring clip 214, when assembled together, resist axial movement of the cutting bit into and out of the tool holder of FIG. 1.

The spring clip 214 is shown with indentations 216 disposed along a length of the spring clip 214 and configured to engage with the indentations 212 of the shank 202. The indentations 216 may be formed by bending portions of the wall of the spring clip 214 inwards towards a center of the spring clip 214. The indentations 212 of the shank 202 and the indentations 216 of the spring clip 214 may be configured to interface, e.g., have a similar or corresponding shape such that the indentations 216 fit into the indentations 212.

In examples, the indentations 212 includes first and second indentations on a first side of the shank 202. The indentations 212 are axially aligned (e.g., in line along a length of the shank 202. The indentations 212 may also include a first indentation on a first side of the shank 202 and a second indentation on a second side of the shank 202 opposite the first side. In examples, the indentations 212 may include a single indentation or multiple indentations. In some examples multiple indentations may provide for load sharing of the load experienced between the spring clip 214 and the shank 202 and may prevent over-expanding the spring clip 214.

Figure 5:
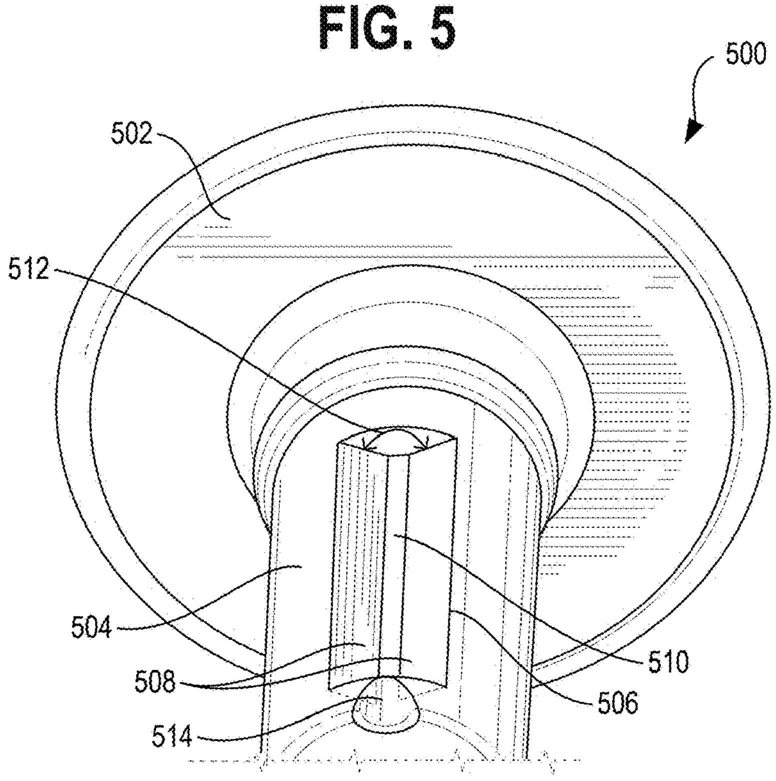
FIG. 5 illustrates a perspective view of a cutting bit, according to at least one example.

The indentations 212 of the shank 202 includes rotation-limiting surfaces configured to interact with spring clip 214 and specifically with the indentations 216 of the spring clip 214 to limit rotation between the shank 202 and spring clip 214. In the aspect shown in FIG. 5 below, rotation-limiting surface of the indentation 212 includes a first planar surface and a second planar surface. The first planar surface and the second planar surface are recessed into the shank 202, and may be adjacent one another and arranged at an angle (see FIG. 5) relative to one another. The angle may be in a first range of about 135-145°, and in some aspects about 140°. In some aspects (not shown), the first and second planar surfaces may be spaced apart from one another, e.g., separated by a third planar surface, as shown in FIG. 5. Each of first and second planar surfaces may be substantially rectangular, and have a length (along longitudinal axis of shank 202) of about 17-37 mm, and in some aspects about 27 mm, and a width (transverse to longitudinal axis of shank 202) of about 5-10 mm, and in some aspects about 7 mm. In other aspects, first and second planar surfaces may be shapes other than rectangular, e.g., pill-shaped, oval, trapezoidal, hexagonal, or the like.

In some aspects, each of the first and the second planar surfaces may be spaced apart from the shoulder 210 by about 2-8 mm, and in some aspects about 5 mm. In some aspects, each of the first and the second planar surfaces may be spaced apart from a proximal end of the shank 202 by about 5-16 mm, and in some aspects about 12 mm.

Figure 3:
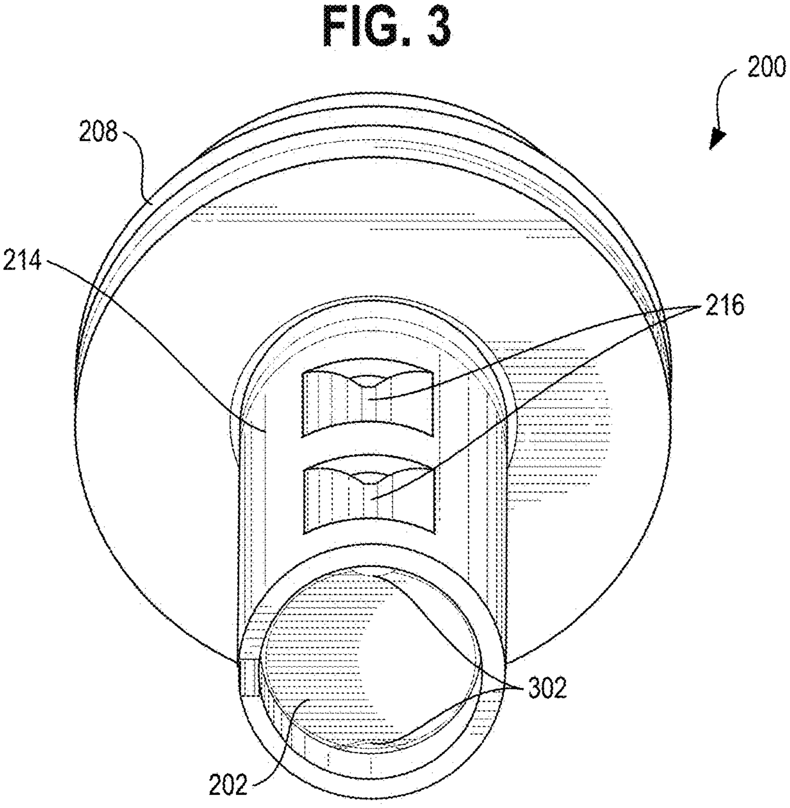
FIG. 3 illustrates a perspective view of a cutting bit assembly, including the cutting bit of FIG. 2, according to at least one example.

The shank 202 may retain spring clip 214 axially on the body of the shank 202. In the expanded configuration, spring clip 214 may have an inner diameter larger than or equal to an outer diameter of the proximal end of the shank 202, so that spring clip 214 may be slid over proximal end to install the spring clip 214 onto the body of the shank 202. As depicted in FIG. 3, ramps 302 may aid in guiding the indentations 216 into the indentations 212 of the shank 202 as the spring clip 214 is slid onto the shank 202.

The washer 142 may be installed after the spring clip 214 has been slid onto the shank 202. The washer 142 forces the spring clip 214 into a contracted configuration, in which the inner diameter of spring clip 214 is less than the outer diameter of the shank 202. As such, spring clip 214 cannot slide over a proximal end of the shank 202 when in the contracted configuration. Similarly, the inner diameter of spring clip 214, in the contracted configuration, is less than the outer diameter of the shoulder 210, so the spring clip 214 cannot slide over shoulder 210 when in the contracted configuration. Thus, spring clip 214 is retained between shoulder 210 and shank 202.

Figure 4:
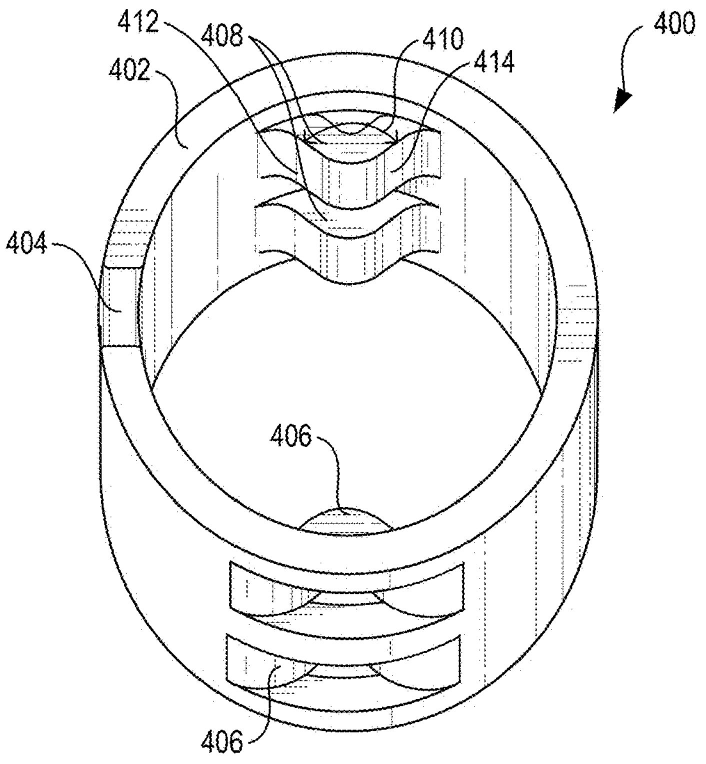
FIG. 4 illustrates a perspective view of a spring clip of a cutting bit assembly, according to at least one example.

FIG. 4 illustrates a perspective view of a spring clip 400 of a cutting bit assembly, according to at least one example. The spring clip 400 may be an example of the spring clip 140 or spring clip 214 of FIGS. 1-2. The spring clip 400 has a body 402 that extends along a longitudinal axis and is generally tubular in shape (apart from indentations 406, 408). Spring clip 400 includes a slit 404 extending from a proximal end to a distal end to allow spring clip 400 to transition between the contracted configuration and the expanded configuration. In particular, slit 404 is narrower in the contracted configuration of spring clip 400 than in the expanded configuration of spring clip 400. In some aspects, edges of the spring clip 400 may be beveled. In some aspects, the wall thickness of the body 402 may be between about 1.50 mm and 1.75 mm.

Spring clip 400 includes one or more indentations extending radially inward towards a central longitudinal axis of the spring clip 400. In the aspect shown in FIG. 4, spring clip 400 includes two indentations 406 spaced apart along a longitudinal axis and two indentations 408 spaced apart along a longitudinal axis (e.g., a longitudinal axis parallel with the longitudinal axis of the spring clip 400). Indentations 406, 408 may be formed by a press operation such that indentations 406, 408 are indented into the body 402 of the spring clip 400. In other aspects, indentations 406, 408 may include material added to inner sidewall of the spring clip 400. Indentations 406, 408 includes a third planar surface 412 and a fourth planar surface 414. Third planar surface 412 and fourth planar surface 414 may be arranged at an angle 410 relative to one another. Angle 410 may be about 136-156°, and in some aspects about 146°. Third planar surface 412 and fourth planar surface 414 may each be substantially rectangular, and have a length (along a longitudinal axis of the spring clip 400) of about 7-17 mm, and in some aspects about 11 mm, and a width (transverse to longitudinal axis of spring clip 400) of about 4-8 mm, and in some aspects about 6 mm. The overall length of the indentations, including both the third planar surface 412 and the fourth planar surface 414 and analogous planar surfaces of indentations 406, may be about 8-35 mm, and in some aspects about 27 mm. In other aspects, third planar surface 414 and fourth planar surface 414 may be shapes other than rectangular, e.g., pill-shaped, oval, trapezoidal, hexagonal, or the like.

FIG. 5 illustrates a perspective view of a cutting bit 500, according to at least one example. The cutting bit 500 may be an example of a cutting bit as part of the cutting bit assembly 130 such as cutting bit 200 as shown and described herein. The cutting bit 500 includes a cutting tip 502 and a shank 504 as described herein. The shank 504 defines a channel 506 that provides rotation-limiting surfaces to limit rotation of the shank 504 relative to a spring clip when assembled together. The channel 506 includes surfaces 508 such as a first surface and a second surface. The surfaces 508 may include rotation-limiting surfaces that engage with the indentations of the spring clip. A third surface 510 between the surface 508 may be a third planar surface and may separate the surfaces 508 by a distance to accommodate the indentations of the spring clip. The surfaces 508 may have generally rectangular shapes and include a first planar surface and a second planar surface and are arranged at an angle 512 relative to one another. Angle 512 may be about 135-145°, and in some aspects about 140°. First planar surface and second planar surface may each be substantially rectangular, and have a length (along a longitudinal axis of the spring clip shank 504) of about 7-17 mm, and in some aspects about 11 mm, and a width (transverse to longitudinal axis of the shank 504) of about 4-8 mm, and in some aspects about 6 mm. The overall length of the channel, including the surfaces 508 and analogous planar surfaces, may be about 8-35 mm, and in some aspects about 27 mm. In some aspects, the surfaces 508 may be shapes other than rectangular, e.g., pill-shaped, oval, trapezoidal, hexagonal, or the like.

An indentation of the spring clip interacts with surfaces 508 of the channel 506 to limit rotation of shank 504 relative to the spring clip in both the contracted and expanded configurations of the spring clip. In particular, the third planar surface 412 of spring clip 400 is configured to engage the first planar surface (of surfaces 508) of shank 504 to limit rotation of the shank 504 in a clockwise direction within the spring clip. Similarly, fourth planar surface 414 of the spring clip 400 is configured to engage second planar surface of the surfaces 508 to limit rotation of shank 504 in a counter-clockwise direction within the spring clip.

In some aspects, angle 410 of the indentation 408 of the spring clip is greater than angle 512 of surfaces 508 of shank 504. As such, an angular gap is present between one of the surfaces 508 and one of the third planar surface 412 or the fourth planar surface 414. The angular gap allows limited rotation of the shank 504 within the spring clip. The shank 504 may be rotated in clockwise direction within the spring clip until the first planar surface of rotation-limiting surface engages third planar surface 412 of indentation 408. Similarly, shank 504 may be rotated in counter-clockwise direction within spring clip until second planar surface of rotation-limiting surface engages fourth planar surface 414 of indentation 408.

The angle 410 of the indentation 408 may be greater when the spring clip 400 is in an expanded configuration compared to the retracted configuration, due to the overall expansion of the spring clip 400. Thus, the shank 504 may have less rotational freedom relative to spring clip 400 when spring clip 400 is in the contracted configuration compared to when spring clip 400 is in expanded configuration.

Indentation 408 may be substantially identical to indentation 406, including a third planar surface and a fourth planar surface analogous to third planar surface 412 and fourth planar surface 414, respectively. Indentations 406, 408 may be separated by a rib, planar surface, or other geometry that provides rigidity to and resists deformation of spring clip 400. In some aspects, spring clip 400 may include only a single indentation 408.

In order to accommodate indentations 406, 408, a proximal end the shank 504 includes a notch 514 that provide clearance for indentations 406, 408 to slide over proximal end of the shank 504 onto the body of the shank 504 when spring clip 400 is being installed on shank 504. The notch 514 is shaped to accommodate indentations 406, 408. Thus, notch 514 may include a pair of planar surfaces respectively allowing third planar surface 412 and fourth planar surface 414 of indentation 408 (along with analogous surfaces of indentation 406) to slide over the proximal end of the shank 504.

Figure 6:
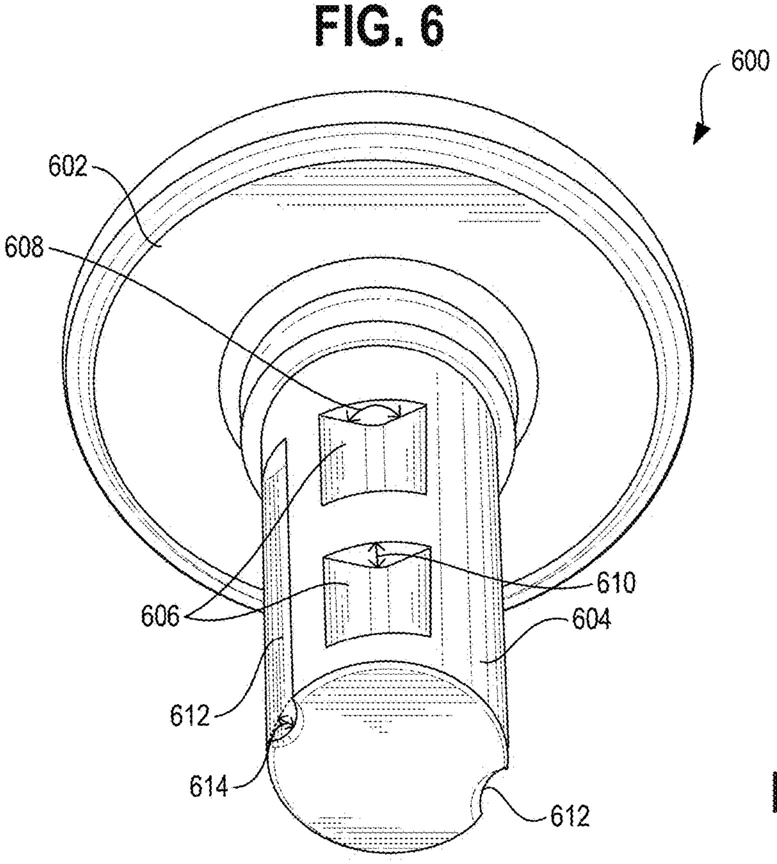
FIG. 6 illustrates a perspective view of a cutting bit, according to at least one example.

FIG. 6 illustrates a perspective view of a cutting bit 600, according to at least one example. The cutting bit 600 includes a cutting tip 602 as described herein. The cutting bit 600 also includes a shank 604 that defines one or more channels 606 such as the channel 506 of FIG. 5. The multiple channels 606 are disposed along a length of the shank 604 and separated by an intermediate portion between the channels 606.

Within the channels, the first surface and the second surface are disposed relative to one another by angle 608. The surfaces of the channels 606 may have generally rectangular shapes and include a first planar surface and a second planar surface and are arranged at an angle 608 relative to one another. Angle 608 may be about 135-145°, and in some aspects about 140°. First planar surface and second planar surface may each be substantially rectangular, and have a length (along a longitudinal axis of the spring clip shank 604) of about 7-17 mm, and in some aspects about 11 mm, and a width (transverse to longitudinal axis of the shank 604) of about 4-8 mm, and in some aspects about 6 mm. The overall length of the channel, including the surfaces of the channels 606 and analogous planar surfaces, may be about 8-35 mm, and in some aspects about 27 mm. In some aspects, the surfaces may be shapes other than rectangular, e.g., pill-shaped, oval, trapezoidal, hexagonal, or the like.

The channels 606 may each extend to a maximum depth 610 at a center of the channels 606 between the surfaces. The maximum depth 610 may be in a range of one to eight millimeters, for example at a depth of five millimeters.

The shank 604 further includes channels 612 that extend from a proximal end of the shank 604 along at least a portion of the length of the shank 604 in a direction parallel with a longitudinal axis of the shank 604. The channels 612 may have a depth 614 that is less than the maximum depth 610 of the channels 606. The channels 612 may be used for insertion of the shank 604 into the spring clip. The channels 612 may receive the indentations of the spring clip. The channels 612 may receive the indentations of the spring clip and after the shank 604 is inserted into the spring clip then the cutting bit 600 may be rotated such that the indentations move from the channels 612 to the channels 606. In some examples, the channels 612 may have a consistent depth along the length of the channels 612. In some examples, the channels 612 may have a variable depth that increases or decreases in depth along the length of the shank 604 from the proximal end along the length of the shank 604.

Figure 7:
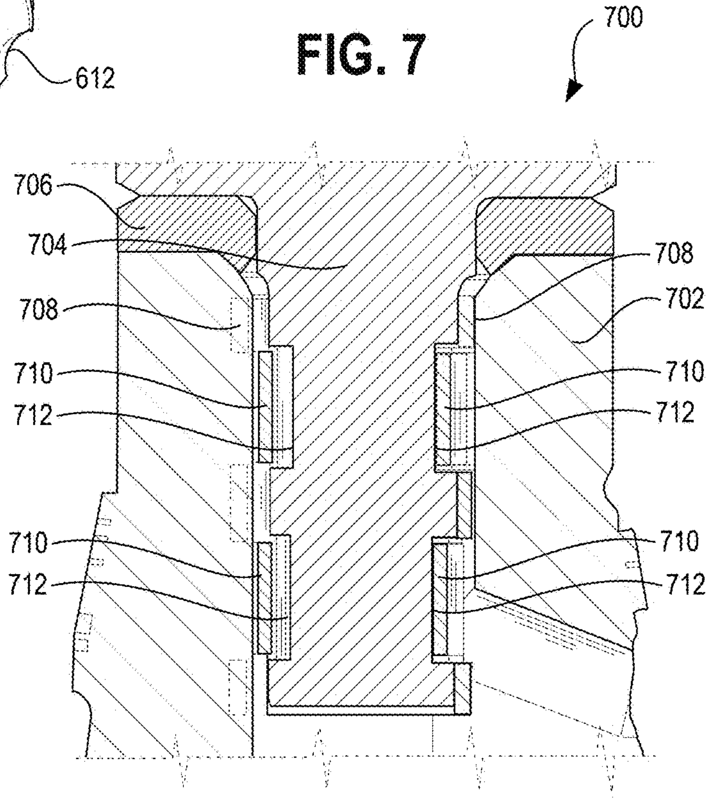
FIG. 7 illustrates a section view of a cutting bit assembly in a tool holder, according to at least one example.

FIG. 7 illustrates a section view of a cutting bit assembly 700 in a tool holder, according to at least one example. The cutting bit assembly 700 includes a holder 702 such as shown and described with respect to FIG. 1. The cutting bit assembly 700 also includes a cutting bit 704 and washer 706 as shown and described herein.

Within the holder 702, the spring clip 708 fits with a friction or interference fit. The spring clip 708 has indentations 710 that interface with the channels 712 of the cutting bit 704. The spring clip 708 fits within the holder 702 and retains the cutting bit 704 in position as well. As the cutting bit and spring clip shift within the holder 702, the spring clip 708 and cutting bit 704 do not slide out of the opening of the holder 702. For instance, as depicted in FIG. 7, the spring clip is biased towards the left side of the figure, however the depth of the indentation 710 and the channel 712 prevent the cutting bit 704 from slipping out of the holder 702. The spring clip 708 allows movement laterally (e.g., left-right as depicted in FIG. 7) based on the space available within the holder 702.

As a result of limiting or prohibiting rotation of the cutting bit 704 within the holder 702 during operation of the cold planer, the life of the cutting bit 704 may be increased by limiting an area of the cutting tip that experiences wear. Further, the life of tool holder may be increased because there may be reduced wear caused by flange and washer rotating against the end face of the cutting bit 704.

As the holder 702 rotates, the cutting bit 704 breaks a roadway surface into small pieces that can be removed and taken from the worksite. The interaction between rotation-limiting surface of the shank of the cutting bit 704 and indentations of the spring clip 708 limits and/or prohibits rotation of the cutting bit 704 within the holder 702, which may increase the life of cutting bit 704 and/or holder 702.

Particularly, by limiting or prohibiting rotation of cutting bit 704, only the cutting side of cutting tip experiences significant wear during milling operation. The non-cutting side of cutting tip experiences less significant or negligible wear and therefore provides structural support for the cutting side of cutting tip. Furthermore, the lack of significant rotation of cutting bit 704 results in low or negligible wear on end face of holder 702.

Figure 8:
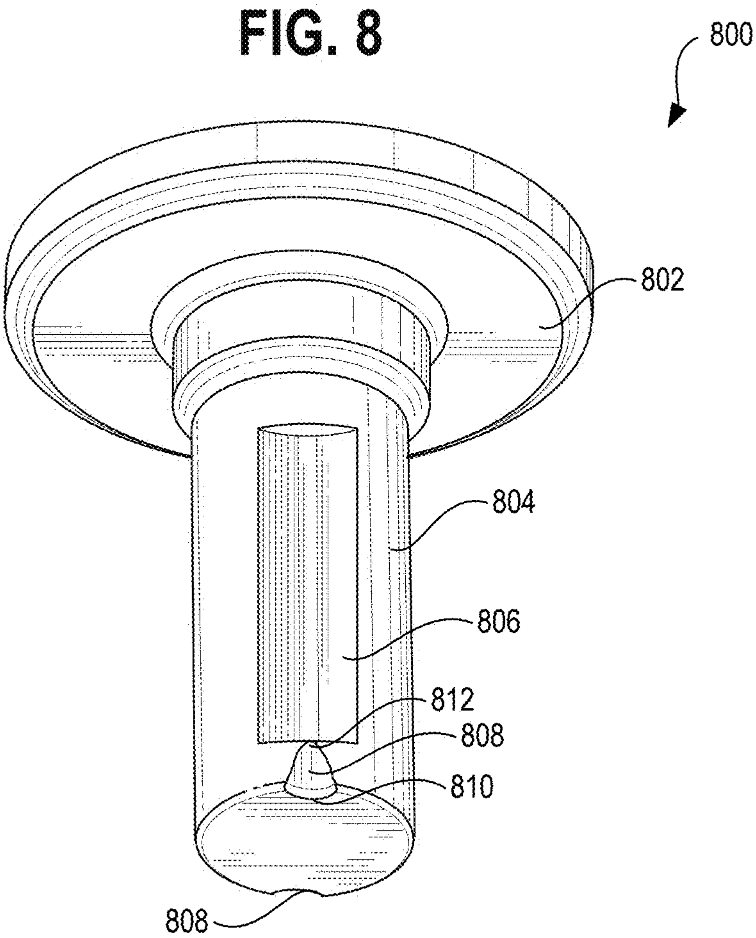
FIG. 8 illustrates a perspective view of a cutting bit, according to at least one example.

FIG. 8 illustrates a perspective view of a cutting bit 800, according to at least one example. The cutting bit 800 may be similar or identical to other cutting bits described herein. Components not specifically described in relation to FIG. 8 may be presumed to be substantially similar to corresponding components of the aspect of FIGS. 1-7. The cutting bit 800 includes a cutting tip 802, shank 804, channel 806, and a notch 808. The shank 804 may be generally cylindrical with the exception of a notch 808 that aids in assembly, as described herein. The end of the shank 804 may have an outer diameter of slightly less than the diameter of mounting bore 122 of tool holder 110 so that the shank 804 has a clearance fit with mounting bore 122. For example, the shank 804 may have an outer diameter of slightly less than 20 mm.

In order to accommodate indentations of the spring clip, the shank 804 includes a notch 808 that provide clearance for indentations to slide over the end of the shank 804 onto the body of the shank 804 when spring clip is being installed on shank 804. The notch 808 is shaped to accommodate indentations. The shank 804 includes a first notch and a second notch disposed on opposite sides of the shank 804. The notch 808 may include a pair of planar surfaces that allow the indentations to slide over the proximal end of the shank 804. As depicted in FIG. 8, the notch 808 extends from a first end 810 to a second end 812. The first end 810, disposed at the end of the shank 804, has a first width and a first depth. The second end 812 has a second width and a second depth, less than the first width and the first depth. In this manner, the notch 808 receives the indentations and guides and/or deforms the spring clip to cause the indentations to rest within the channel 806. The shape of the notch 808 and configuration thereof may enable the spring clip to slide onto the shank 804 but may resist or prevent the spring clip sliding off the shank 804 after assembly together.

Figure 9:
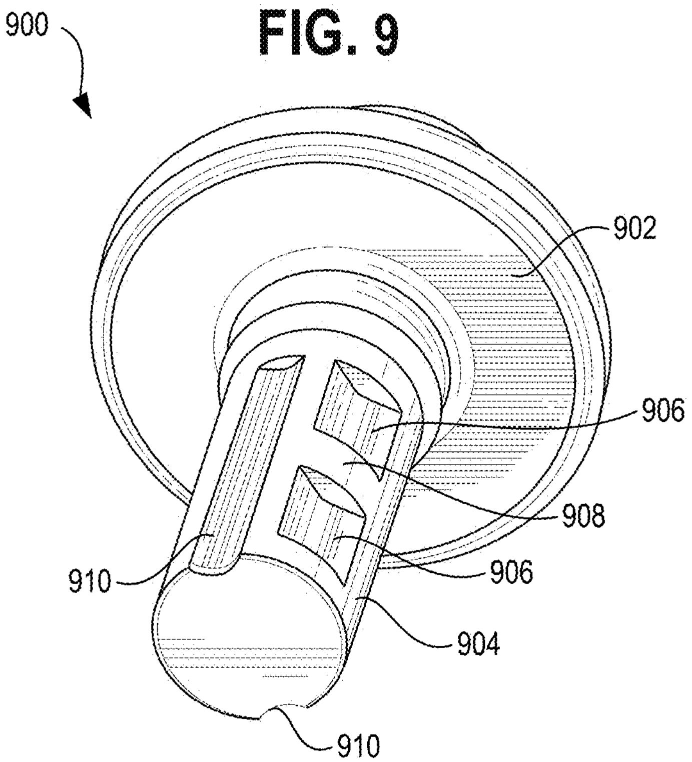
FIG. 9 illustrates a perspective view of a cutting bit, according to at least one example.

FIG. 9 illustrates a perspective view of a cutting bit 900, according to at least one example. The cutting bit 900 may be similar or identical to other cutting bits described herein. Components not specifically described in relation to FIG. 9 may be presumed to be substantially similar to corresponding components of the aspect of FIGS. 1-8. The cutting bit 900 includes a cutting tip 902, shank 904, channels 906, intermediate portion 908, and a channel 910. The shank 904 may be generally cylindrical with the exception of a channel 910 and the channels 906, as described herein. The end of the shank 904 may have an outer diameter of slightly less than the diameter of mounting bore 122 of tool holder 110 so that the shank 904 has a clearance fit with mounting bore 122. For example, the shank 904 may have an outer diameter of slightly less than 20 mm.

The channels 906 are disposed along a length of the shank 904 and separated by an intermediate portion 908 between the channels 906 that has a diameter greater than the diameter of the shank 904 at the channels 906.

Within the channels 906, a first surface and a second surface are disposed relative to one another by an angle. The surfaces of the channels 906 may have generally rectangular shapes and include a first planar surface and a second planar surface and are arranged at an angle relative to one another. The angle may be about 135-145°, and in some aspects about 140°. First planar surface and second planar surface may each be substantially rectangular, and have a length (along a longitudinal axis of the spring clip shank) of about 7-17 mm, and in some aspects about 11 mm, and a width (transverse to longitudinal axis of the shank) of about 4-8 mm, and in some aspects about 6 mm. The overall length of the channel, including the surfaces of the channels 906 and analogous planar surfaces, may be about 8-35 mm, and in some aspects about 27 mm. In some aspects, the surfaces may be shapes other than rectangular, e.g., pill-shaped, oval, trapezoidal, hexagonal, or the like.

The channels 906 may each extend to a maximum depth at a center of the channels 906 between the surfaces. The maximum depth may be in a range of one to eight millimeters, for example at a depth of five millimeters.

The shank 904 further includes channels 910 that extend from a proximal end of the shank 904 along at least a portion of the length of the shank 904 in a direction parallel with a longitudinal axis of the shank 904. The channels 910 may have a depth that is less than the maximum depth of the channels 906. The channels 910 may be used for insertion of the shank 904 into the spring clip. The channels 910 may receive the indentations of the spring clip. The channels 910 may receive the indentations of the spring clip and after the shank 904 is inserted into the spring clip then the cutting bit 900 may be rotated such that the indentations move from the channels 910 to the channels 906. In some examples, the channels 910 may have a consistent depth along the length of the channels 910. In some examples, the channels 910 may have a variable depth that increases or decreases in depth along the length of the shank 904 from the proximal end along the length of the shank 904. Though depicted with two channels 910, in some examples the shank 904 may include one, two, three, four, or more such channels 910 disposed on the shank 904.

Figure 10:
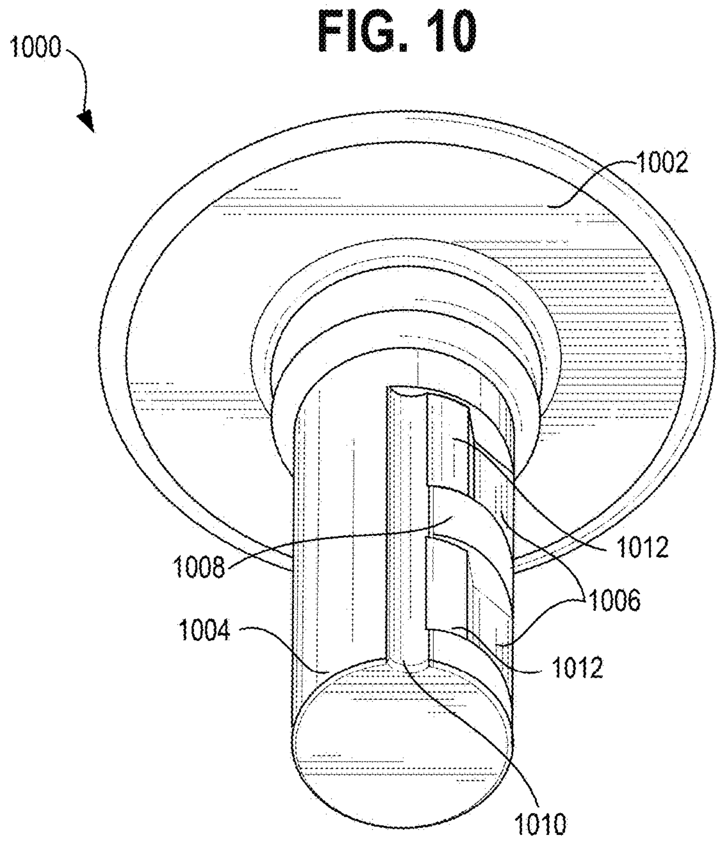
FIG. 10 illustrates a perspective view of a cutting bit, according to at least one example.

FIG. 10 illustrates a perspective view of a cutting bit 1000, according to at least one example. The cutting bit 1000 may be similar to the cutting bit 900 of FIG. 9. The cutting bit 1000 may include a cutting tip 1002, shank 1004, channels 1006, intermediate portion 1008, and channel 1010 similar to the cutting tip 902, shank 904, channels 906, intermediate portion 908, and channel 910 as described with respect to FIG. 9 above. The cutting bit 1000 includes a ramped section 1012 disposed between the channels 1006 and the channel 1010. The channel 1010 may enable the indentations of the spring clip to move axially along a length of the shank 1004. After sliding the shank 1004 into the spring clip, the shank 1004 may be rotated such that the indentations rotate over the ramped section 1012 into the channel 1006. Once the indentations reach the channels 1006, the axial movement of the spring clip relative to the shank 1004 is restricted or prevented due to the indentations being captured in the channels 1006 as described herein.

Figure 11:
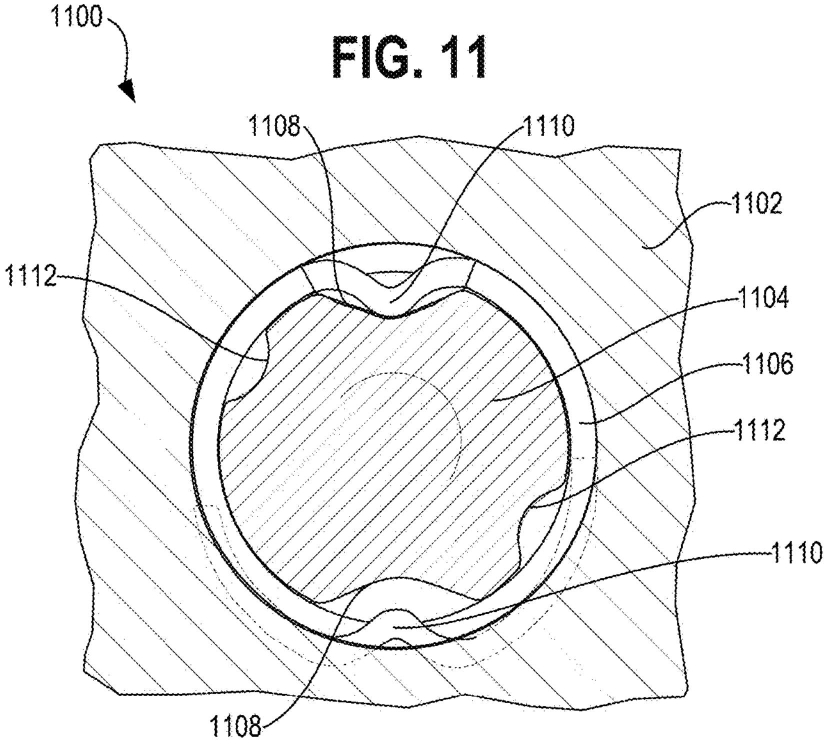
FIG. 11 illustrates a section view of a shank of a cutting bit and a spring clip in a tool holder, according to at least one example.

FIG. 11 illustrates a section view 1100 of a shank 1104 of a cutting bit and a spring clip in a tool holder 1102, according to at least one example. The section view 1100 includes the holder 1102, shank 1104, and spring clip 1106 as described herein with respect to FIGS. 1-10 according to various examples. The section view 1100 shows the shank 1104 contained by the spring clip 1106 within the tool holder 1102. The shank 1104 includes channels 1108 to capture the indentations 1110 of the spring clip 1106 and channels 1112 for assembly of the shank 1104 with the spring clip 1106 as described herein. The shank 1104 may be slid into the opening defined by the spring clip 1106 with the indentations 1110 within the channels 1112 to move axially, as described above. Upon reaching the insertion depth of the shank 1104 within the spring clip 1106, the shank 1104 is rotated until the indentations 1110 reach the channels 1108 and axially prevent movement of the shank 1104 and spring clip 1106 relative to one another, thereby capturing the cutting bit within the tool holder 1102.

Figure 12:
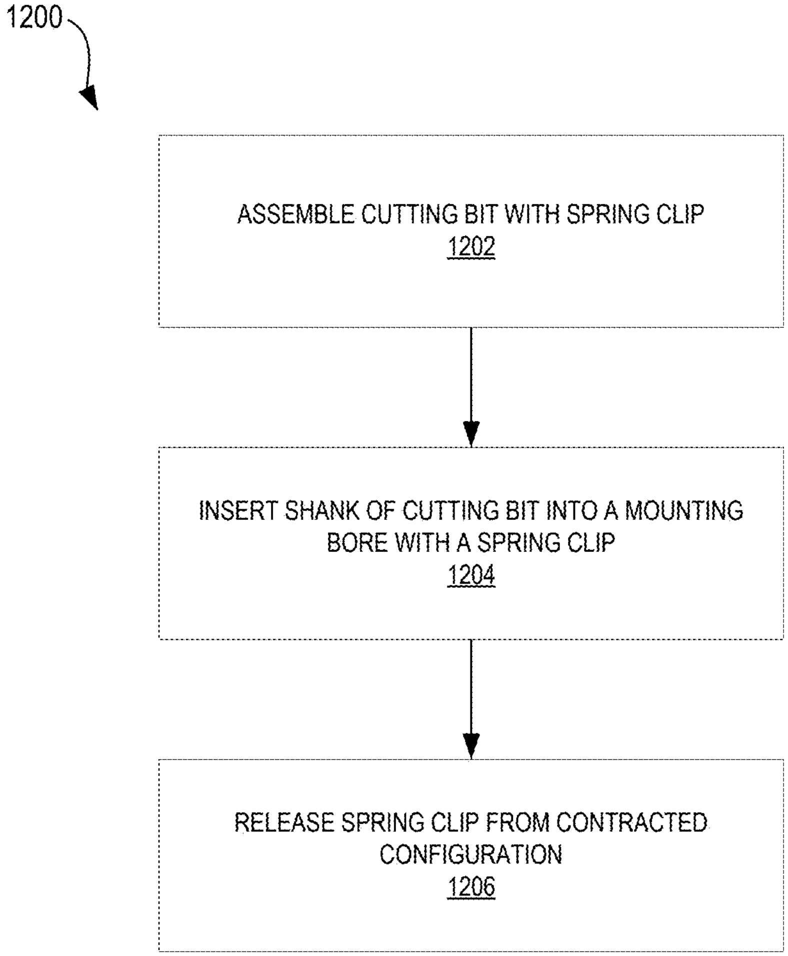
FIG. 12 illustrates a process for installing a cutting bit into a tool holder, according to at least one example.

FIG. 12 illustrates a process 1200 for installing a cutting bit into a tool holder, according to at least one example. Process 1200 includes, at step 1202, assembling a cutting bit, such as described herein, with a spring clip, as described herein. The cutting bit fits within a cylindrical spring clip and indentations of the spring clip slide into channels of the shank of the cutting bit and axially lock the spring clip and shank relative to one another.

The process 1200 further includes, at step 1204, inserting the shank of cutting bit assembly into mounting bore of tool holder with spring in the contracted configuration. A washer surrounds spring clip to hold the spring clip in the contracted configuration. An end of the shank of the cutting bit is inserted first into mounting bore, and is pressed into mounting bore until the washer contacts an end face of the tool holder.

The process 1200 further includes, at step 1206, releasing the spring clip from the contracted configuration so that the spring clip exerts a radially outward force against the mounting bore of the tool holder, thereby causing the spring clip to be rotationally locked to mounting bore. Releasing the spring clip at step 1206 may be achieved by pressing and/or hammering the shank fully into the mounting bore of the tool holder so that the washer is pressed onto the shoulder of the shank. For example, the shank may be pressed into the mounting bore using a pneumatic gun equipped with an installation cup so as to not damage the cutting tip. The washer is slid along the outer surface of the spring clip, until the washer clears the spring clip, travels over the shoulder, and engages the flange of the cutting tip. As the spring clip is no longer radially constrained by the washer in the contracted configuration, the spring clip radially expands and frictionally engages the mounting bore of the tool holder. The inner diameter of the mounting bore is less than the outer diameter of the spring clip in the expanded configuration, so the spring bias of the spring clip generates a frictional force against the mounting bore. Thus, the spring clip is rotationally locked in the mounting bore. Further, the rotation-limiting surface of shank interacts with the indentation of the spring clip to limit rotation of the shank, and therefore limit rotation of cutting tip, relative to the spring clip and the mounting bore.

In some aspects, attempted rotation of the cutting tip may increase the grip of the spring clip on the mounting bore. Rotation of the shank relative to the spring clip such that a planar surface of the shank engages a third planar surface of the spring clip and causes the radially outward force exerted by the spring clip on the mounting bore to increase. As such, the anti-rotation effect of the spring clip is enhanced. Similarly, rotation of the shank relative to the spring clip such that a second planar surface of the shank engages a fourth planar surface of the spring clip and causes the force exerted by the spring clip on the mounting bore to increase.

As a result of limiting or prohibiting rotation of the cutting bit assembly during operation of the cold planer, the life of the cutting assembly may be increased by limiting an area of the cutting tip that experiences wear. Further, the life of tool holder may be increased because there may be reduced wear caused by flange and washer rotating against the end face.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features, it is to be understood that the subject matter defined in the appended claims is not necessarily limited to the specific features described. Rather, the specific features are disclosed as illustrative forms of implementing the claims.

INDUSTRIAL APPLICABILITY

The present disclosure provides systems and components for ground engaging tools, such as bucket teeth, and in particular to ground engaging tools designs that include wear resistant materials within the ground engaging tools in strategic locations based on wear simulation to maintain the shape of the tool and digging performance as it wears. The ground engaging tools incorporate strategically placed wear resistant materials shaped to promote and maintain a sharp profile for penetrating the working material throughout the life of the tool.

The disclosed aspects of cutting bit assembly as set forth in the present disclosure may be used for milling surfaces, such as asphalt roadways, when installed in milling drum of a cold planer (also called a road mill or scarifier). As milling drum rotates, cutting bit assembly breaks the roadway surface into small pieces that can be removed and taken from the worksite. The interaction between rotation-limiting surface of shank and indentations of spring clip limits and/or prohibits rotation of cutting bit assembly within tool holder, which may increase the life of cutting bit assembly and/or tool holder. Particularly, by limiting or prohibiting rotation of cutting bit assembly, only the cutting side of cutting tip experiences significant wear during milling operation. The non-cutting side of cutting tip experiences less significant or negligible wear and therefore provides structural support for the cutting side of cutting tip. Furthermore, the lack of significant rotation of cutting bit assembly results in low or negligible wear on end face of tool holder.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

The invention claimed is:

1. A cutting bit assembly for attachment to a tool holder of a milling-type machine, the cutting bit assembly comprising:

a cutting tip;

a cylindrical shank extending from the cutting tip and including a rotation-limiting surface defining a channel extending along a portion of the cylindrical shank, the channel defining a v-shaped groove with the rotation-limiting surface including a concave surface; and a spring clip that surrounds at least a portion of the cylindrical shank when the cylindrical shank and the spring clip are inserted into the tool holder and comprising an indentation configured to interact with the rotation-limiting surface of the cylindrical shank to limit rotation of the cylindrical shank relative to the spring clip.

2. The cutting bit assembly of claim 1, wherein the rotation-limiting surface comprises:

a first planar surface; and a second planar surface arranged at a first angle relative to the first planar surface, wherein the indentation comprises:

a third planar surface configured to engage the first planar surface; and a fourth planar surface arranged at a second angle relative to the third planar surface and configured to engage the second planar surface.

3. The cutting bit assembly of claim 2, wherein the second angle is greater than the first angle to allow limited rotation between the cylindrical shank and the spring clip.

4. The cutting bit assembly of claim 2, wherein the first angle is in a first range of 135 degrees to 145 degrees and the second angle is in a second range of 136 degrees to 156 degrees.

5. The cutting bit assembly of claim 1, wherein the channel comprises:

a first planar surface;

a second planar surface arranged at a first angle relative to the first planar surface; and a third planar surface disposed between the first planar surface and the second planar surface.

6. The cutting bit assembly of claim 1, wherein the cylindrical shank further comprises a ramped surface extending from an end of the cylindrical shank opposite the cutting tip into the channel, the ramped surface disposed at a first radial distance from a center of the cylindrical shank and extending to a second radial distance adjacent the channel, the second radial distance greater than the first radial distance.

7. The cutting bit assembly of claim 1, wherein the cylindrical shank further comprises an assembly groove extending from an end of the cylindrical shank opposite the cutting tip along a length of the cylindrical shank parallel to a length of the channel, a first depth of the assembly groove less than a second depth of the channel.

8. The cutting bit assembly of claim 1, wherein the spring clip has a cylindrical body defining a gap in a wall of the spring clip that enables circumferential expansion and contraction of the spring clip.

9. The cutting bit assembly of claim 1, wherein:

the indentation is a first indentation and the spring clip includes a second indentation disposed on opposite sides of the spring clip; and the channel is a first channel and the cylindrical shank includes a second channel disposed on an opposite side of the cylindrical shank from the first channel.

10. A cutting bit system comprising:

a cutting tip;

a cylindrical shank extending from the cutting tip and including a rotation-limiting surface defining a channel extending along a portion of the cylindrical shank; and a spring clip that surrounds at least a portion of the cylindrical shank when the cylindrical shank and spring clip are inserted into a tool holder and comprising an indentation configured to interact with the rotation-limiting surface of the shank to limit rotation of the shank relative to the spring clip.

11. The cutting bit system of claim 10, wherein the indentation of the spring clip is a first indentation, the spring clip further comprising a second indentation.

12. The cutting bit system of claim 11, wherein the first indentation is disposed on a first side of the spring clip and the second indentation is aligned parallel with the first indentation and disposed on a second side of the spring clip opposite the first side.

13. The cutting bit system of claim 10, wherein the rotation-limiting surface comprises:

a first planar surface; and a second planar surface arranged at a first angle relative to the first planar surface, wherein the indentation comprises:

a third planar surface configured to engage the first planar surface; and a fourth planar surface arranged at a second angle relative to the third planar surface and configured to engage the second planar surface.

14. The cutting bit system of claim 13, wherein the second angle is greater than the first angle to allow a limited amount of rotation between the cylindrical shank and the spring clip.

15. The cutting bit system of claim 10, wherein the channel comprises a first channel and a second channel, the first channel and the second channel disposed along a length of the cylindrical shank and separated by an intermediate portion of the cylindrical shank.

16. The cutting bit system of claim 15, wherein the indentation of the spring clip comprises a first indentation and a second indentation disposed along a length of the spring clip and separated by a distance corresponding to a length of the intermediate portion.

17. A method for installing a cutting bit into a tool holder of a milling-type machine, the method comprising:

inserting a shank of the cutting bit into a mounting bore of the tool holder with a spring clip in a contracted configuration; and releasing the spring clip from the contracted configuration so that the spring clip exerts a radially outward force against the mounting bore of the tool holder, thereby causing the spring clip to be rotationally locked to the mounting bore, wherein the spring clip comprises an indentation configured to interact with a channel including a rotation-limiting surface of the shank to limit rotation of the shank relative to the spring clip and to the tool holder.

18. The method of claim 17, wherein the rotation-limiting surface comprises:

a first planar surface; and a second planar surface arranged at an angle relative to the first planar surface, wherein the indentation comprises:

a third planar surface configured to engage the first planar surface; and a fourth planar surface arranged at an angle relative to the third planar surface and configured to engage the second planar surface.

19. The method of claim 18, wherein the second angle is greater than the first angle to allow limited rotation between the shank and the spring clip.

20. The method of claim 17, further comprising inserting the shank of the cutting bit into the spring clip, the shank including a ramped surface configured to guide the indentation of the spring clip into the channel of the shank.

* * * * *